(12) United States Patent
Shimomura (10) Patent No.: US 11,954,476 B2
(45) Date of Patent: Apr. 9, 2024

(54) ON-BOARD UPDATE APPARATUS, UPDATE PROCESSING SYSTEM, UPDATE PROCESSING METHOD, AND COMPUTER PROGRAM

(71) Applicant: Sumitomo Wiring Systems, Ltd., Yokkaichi (JP)

(72) Inventor: Yoshikuni Shimomura, Yokkaichi (JP)

(73) Assignee: Sumitomo Wiring Systems, Ltd., Yokkaichi (JP)

( * ) Notice: Subject to any disclaimer, the term of this patent is extended or adjusted under 35 U.S.C. 154(b) by 212 days.

(21) Appl. No.: 17/435,617

(22) PCT Filed: Mar. 2, 2020

(86) PCT No.: PCT/JP2020/008683
§ 371 (c)(1),
(2) Date: Sep. 1, 2021

(87) PCT Pub. No.: WO2020/184255
PCT Pub. Date: Sep. 17, 2020

(65) Prior Publication Data
US 2022/0156056 A1 May 19, 2022

(30) Foreign Application Priority Data
Mar. 8, 2019 (JP) .................................. 2019-042788

(51) Int. Cl.
*G06F 9/445* (2018.01)
*B60R 16/023* (2006.01)
(Continued)

(52) U.S. Cl.
CPC ............ *G06F 8/65* (2013.01); *B60R 16/0231* (2013.01)

(58) Field of Classification Search
CPC ........... H04W 4/40; H04W 4/38; H04W 4/70; H04W 4/48; H04W 4/90; H04W 52/0254;
(Continued)

(56) References Cited

U.S. PATENT DOCUMENTS 9,946,531 B1 * 4/2018 Fields ..................... G06F 8/65
2017/0263123 A1 * 9/2017 Sachdev ................ G06V 20/52
(Continued)

FOREIGN PATENT DOCUMENTS

JP 2004-127106 A 4/2004

OTHER PUBLICATIONS

International Search Report, Application No. PCT/JP2020/008683, dated Mar. 24, 2020.

*Primary Examiner* — Chuck O Kendall
(74) *Attorney, Agent, or Firm* — Honigman LLP (57) ABSTRACT

An on-board update apparatus includes: a communication unit configured to communicate with a first on-board apparatus including a storage unit that stores a program in a rewritable manner and a second on-board apparatus including a sensor that performs detection of a person present around a vehicle and configured to transmit a detection result indicating presence or absence of a person around the vehicle; and a processing unit configured to obtain an update program for updating the program stored in the storage unit from outside, and execute update processing of the program stored in the storage unit using the obtained update program, wherein the processing unit executes update processing of the program stored in the storage unit using the update program, when it is determined that no person is present around the vehicle based on the detection result received through the communication unit.

19 Claims, 8 Drawing Sheets

(51) Int. Cl.
*G06F 8/65* (2018.01)
*G06F 9/44* (2018.01)

(58) Field of Classification Search
CPC ....... H04W 4/80; H04W 48/04; H04W 36/32;
H04W 717/173; H04W 717/172; H04W
717/178; G06F 8/65; B60R 16/0231
USPC ................................................. 717/168–178
See application file for complete search history.

(56) References Cited

U.S. PATENT DOCUMENTS

| | | |
|---|---|---|
| 2019/0111907 A1 | 4/2019 | Harata et al. |
| 2019/0294429 A1 | 9/2019 | Mizutani et al. |
| 2021/0255845 A1* | 8/2021 | Itatsu ........................ G06F 8/65 |

* cited by examiner

ON-BOARD UPDATE APPARATUS, UPDATE PROCESSING SYSTEM, UPDATE PROCESSING METHOD, AND COMPUTER PROGRAM

CROSS-REFERENCE TO RELATED APPLICATIONS

This application is the U.S. national stage of PCT/JP2020/008683 filed on Mar. 2, 2020, which claims priority of Japanese Patent Application No. JP 2019-042788 filed on Mar. 8, 2019, the contents of which are incorporated herein.

TECHNICAL FIELD

The present disclosure relates to an on-board update apparatus, an update processing system, an update processing method, and a computer program.

BACKGROUND

Conventionally, on-board apparatuses such as a plurality of electronic control units (ECUs) are installed in a vehicle, and the plurality of ECUs are connected to each other via a communication line such as a controller area network (CAN) bus so as to transmit and receive information to and from each other. Each ECU performs various processes such as control of the vehicle by a processing device such as a central processing unit (CPU) reading and executing a program stored in a storage unit such as a flash memory or an electrically erasable programmable read only memory (EEPROM). The program stored in the storage unit of the ECU needs to be updated to a new program when, for example, a function needs to be added, a problem needs to be corrected, or a version needs to be upgraded. In this case, an update program is transmitted via the communication line to the ECU to be updated.

JP 2017-220091A proposes a vehicular apparatus capable of notifying a user of the vehicle of driving availability when updating a program in response to a request from a terminal operable by the user.

There has been a technical problem that a program update of an on-board apparatus could cause a vehicle to behave unexpectedly, which could endanger a person present around the vehicle. JP 2017-220091A does not consider an unexpected situation in which a person present around a vehicle is at risk.

An object of the present disclosure is to provide an on-board update apparatus, an update processing system, an update processing method, and a computer program capable of executing program update processing of an on-board apparatus after at least confirming that no person is present around a vehicle, and restricting the program update processing when a person is present around the vehicle.

SUMMARY

An on-board update apparatus of the present disclosure includes: a communication unit configured to communicate with a first on-board apparatus including a storage unit that stores a program in a rewritable manner and a second on-board apparatus including a sensor that performs detection of a person present around a vehicle and configured to transmit a detection result indicating presence or absence of a person around the vehicle; and a processing unit configured to obtain an update program for updating the program stored in the storage unit from outside, and execute update processing of the program stored in the storage unit using the obtained update program, wherein the processing unit executes update processing of the program stored in the storage unit using the update program, when it is determined that no person is present around the vehicle based on the detection result received through the communication unit.

An update processing method of the present disclosure is an update processing method for executing update processing of a program stored in a storage unit included in a first on-board apparatus, the update processing method including: a step of obtaining an update program for updating the program stored in the storage unit from outside; a step of performing communication with a second on-board apparatus including a sensor that performs detection of a person present around a vehicle and configured to transmit a detection result indicating presence or absence of a person around the vehicle; a step of determining whether or not a person is present around the vehicle based on the received detection result; and a step of executing update processing of the program stored in the storage unit using the obtained update program when it is determined that no person is present around the vehicle.

A computer program of the present disclosure is a computer program for causing a computer to execute update processing of a program stored in a storage unit included in a first on-board apparatus, the computer program causing the computer to execute: a step of performing communication with a second on-board apparatus including a sensor that performs detection of a person present around a vehicle and configured to transmit a detection result indicating presence or absence of a person around the vehicle; a step of determining whether or not a person is present around the vehicle based on the received detection result; and a step of executing update processing of the program stored in the storage unit using an update program obtained from outside for updating the program when it is determined that no person is present around the vehicle.

Note that the present application can be realized not only as an update processing apparatus including such a characteristic processing unit, but also as an update processing method including such characteristic processing as steps, or as a program for causing a computer to execute such steps, as described above. In addition, the present application can be realized as a semiconductor integrated circuit that realizes a part or all of the update processing apparatus, or can be realized as another system including the update processing apparatus.

Effects of the Present Disclosure

According to the present disclosure, it is possible to provide an on-board update apparatus, an update processing system, an update processing method, and a computer program capable of executing program update processing of an on-board apparatus after confirming that at least no person is present around a vehicle, and restricting the program update processing when a person is present around the vehicle.

DETAILED DESCRIPTION OF PREFERRED EMBODIMENTS

First, embodiments of the present disclosure will be listed and described. In addition, at least some of the embodiments described below may also be freely combined.

An on-board update apparatus according to an aspect includes: a communication unit configured to communicate with a first on-board apparatus including a storage unit that stores a program in a rewritable manner and a second on-board apparatus including a sensor that performs detection of a person present around a vehicle and configured to transmit a detection result indicating presence or absence of a person around the vehicle; and a processing unit configured to obtain an update program for updating the program stored in the storage unit from outside, and execute update processing of the program stored in the storage unit using the obtained update program, wherein the processing unit executes update processing of the program stored in the storage unit using the update program, when it is determined that no person is present around the vehicle based on the detection result received through the communication unit.

In this aspect, the processing unit obtains an update program for updating the program stored in the storage unit of the first on-board apparatus from outside. The processing unit receives, through the communication unit, the detection result transmitted from the second on-board apparatus when executing update processing of the program stored in the storage unit using the obtained update program. The detection result is information indicating presence or absence of a person around the vehicle. The processing unit determines whether or not a person is present around the vehicle based on the received detection result, and executes update processing of the program when it is determined that no person is present around the vehicle. That is to say, when a person is present around the vehicle, the processing unit does not execute update processing of the program stored in the storage unit.

Accordingly, even when the vehicle performs an unexpected operation due to a failure in the program update processing, no person is present around the vehicle. Therefore, even when an unexpected situation related to the program update occurs, harm to people can be avoided.

It is preferable that the communication unit is configured to communicate with a third on-board apparatus including a sensor that performs detection of a person present in the vehicle and configured to transmit an inside-of-vehicle detection result indicating presence or absence of a person in the vehicle, and the processing unit executes update processing of the program stored in the storage unit using the update program, when it is determined that no person is present around and in the vehicle based on the detection result and the inside-of-vehicle detection result received through the communication unit.

In this aspect, the processing unit receives, through the communication unit, the inside-of-vehicle detection result transmitted from the third on-board apparatus when executing update processing of the program stored in the storage unit. The inside-of-vehicle detection result is information indicating presence or absence of a person in the vehicle. The processing unit determines whether or not a person is present around or in the vehicle based on the received detection result and the inside-of-vehicle detection result, and executes update processing of the program when it is determined that no person is present around and in the vehicle. That is to say, when a person is present around and in the vehicle, the processing unit does not execute update processing of the program stored in the storage unit.

Accordingly, even when the vehicle performs an unexpected operation due to a failure in the program update processing, no person is present around and in the vehicle. Therefore, even when an unexpected situation related to the program update occurs, harm to people can be avoided.

It is preferable that the processing unit executes update processing of the program stored in the storage unit using the update program when a predetermined time has elapsed after it is confirmed that no person is present.

In this aspect, the processing unit executes update processing of the program stored in the storage unit after the predetermined time has elapsed since it is confirmed that no person is present around the vehicle. Therefore, it is possible to more reliably detect that no person is present around the vehicle, and to avoid harm to people due to an unexpected situation related to program update.

It is preferable that the processing unit stops update processing of the program executed by the first on-board apparatus when it is determined that a person is present around the vehicle during the update processing of the program, and resumes the update processing of the program when a predetermined time has elapsed since it is again determined that no person is present around the vehicle.

In this aspect, the processing unit temporarily stops update processing when a person is detected around the vehicle during the update processing of the program. The processing unit resumes the update processing of the program when a predetermined time has elapsed since it is again determined that no person is present. Therefore, it is possible to advance update processing in a state where no person is present around the vehicle, and to avoid harm to people due to an unexpected situation related to program update.

It is preferable that the processing unit stops update processing of the program stored in the storage unit when an unlocking operation of a door of the vehicle is performed.

In this aspect, the processing unit temporarily stops update processing when a door unlocking operation is performed during the update processing of the program. When the door is unlocked by remote control, a person may approach the vehicle. Therefore, it is also possible to stop update processing when there is a possibility that a person is present around the vehicle, and to avoid harm to people due to an unexpected situation related to program update.

It is preferable that, in a case where a predetermined time has elapsed without a person being detected around the vehicle, the communication unit is caused to transmit a locking instruction signal for instructing locking of the door of the vehicle.

In this aspect, the processing unit locks the door of the vehicle after a predetermined time has elapsed since it is confirmed that no person is present around the vehicle. Therefore, it is possible to prevent a person from entering the vehicle during program update and operating the vehicle, and to more reliably avoid harm to people due to an unexpected situation related to program update.

It is preferable that when a communication apparatus related to maintenance of a vehicle is connected to an in-vehicle network to which the on-board update apparatus and the first on-board apparatus are connected, update processing of the program stored in the storage unit is executed using the update program regardless of presence or absence of a person around the vehicle.

In this aspect, when a communication apparatus related to the maintenance of the vehicle is connected to the in-vehicle network, update processing of the program is managed by a maintenance worker who has specialized knowledge. Therefore, the processing unit can execute the update processing of the program stored in the storage unit regardless of presence or absence of a person around the vehicle. As a result, unnecessary interruption of program update processing can be prevented, and the maintenance worker can efficiently perform the maintenance work of the vehicle.

It is preferable that the detection result includes a result of performing detection of a person present around the vehicle using an on-board camera that captures an image around the vehicle, or a radar.

In this aspect, it is possible to execute update processing of the program stored in the storage unit after confirming that no person is present around the vehicle using an on-board camera or a radar.

By using an on-board camera, the system can be configured at low cost. The on-board camera includes a camera that captures an image outside visible light, such as an infrared camera.

The radar emits radio waves or ultrasonic waves, and detects reflected waves from an object to detect a person. The radar includes a millimeter-wave radar, an ultrasonic sensor, an infrared sensor, a laser scanner, and the like.

An update processing system according to this aspect includes: the on-board update apparatus according to any one of aspects (1) to (8); a first on-board apparatus including the storage unit that stores the program in a rewritable manner; and a second on-board apparatus including a sensor that performs detection of a person present around the vehicle and configured to transmit the detection result indicating presence or absence of a person around the vehicle.

In this aspect, similarly to the aspect (1), even when the vehicle performs an unexpected operation due to a failure of the program update processing of the on-board apparatus, no person is present around the vehicle. Accordingly, even if an unexpected situation related to program update occurs, harm to people can be avoided.

An update processing method according to this aspect is an update processing method for executing update processing of a program stored in a storage unit included in a first on-board apparatus, the update processing method including: a step of obtaining an update program for updating the program stored in the storage unit from outside; a step of performing communication with a second on-board apparatus including a sensor that performs detection of a person present around a vehicle and configured to transmit a detection result indicating presence or absence of a person around the vehicle; a step of determining whether or not a person is present around the vehicle based on the detection result that is received; and a step of executing update processing of the program stored in the storage unit using the obtained update program when it is determined that no person is present around the vehicle.

In this aspect, similarly to the aspect (1), even when the vehicle performs an unexpected operation due to a failure of program update processing of the on-board apparatus, no person is present around the vehicle. Accordingly, even if an unexpected situation related to program update occurs, harm to people can be avoided.

A computer program according to this aspect is a computer program for causing a computer to execute update processing of a program stored in a storage unit included in a first on-board apparatus, the computer program causing the computer to execute: a step of performing communication with a second on-board apparatus including a sensor that performs detection of a person present around a vehicle and configured to transmit a detection result indicating presence or absence of a person around the vehicle; a step of determining whether or not a person is present around the vehicle based on the detection result that is received; and a step of executing update processing of the program stored in the storage unit using an update program obtained from outside for updating the program when it is determined that no person is present around the vehicle.

In this aspect, it is possible to cause a computer to function as the update processing apparatus according to the aspect (1), and no person is present around the vehicle even when the vehicle performs an unexpected operation due to a failure in the program update processing of the on-board apparatus. Accordingly, even if an unexpected situation related to program update occurs, harm to people can be avoided.

Specific examples of an on-board update apparatus, an update processing system, and an update processing method according to an embodiment of the present disclosure will be described below with reference to the drawings. Note that the present disclosure is not limited to these examples, but is defined by the claims, and is intended to include all modifications that come within the meaning and range of equivalency of the claims.

Hereinafter, the present disclosure will be described in detail with reference to the drawings showing embodiments thereof.

Figure 1:
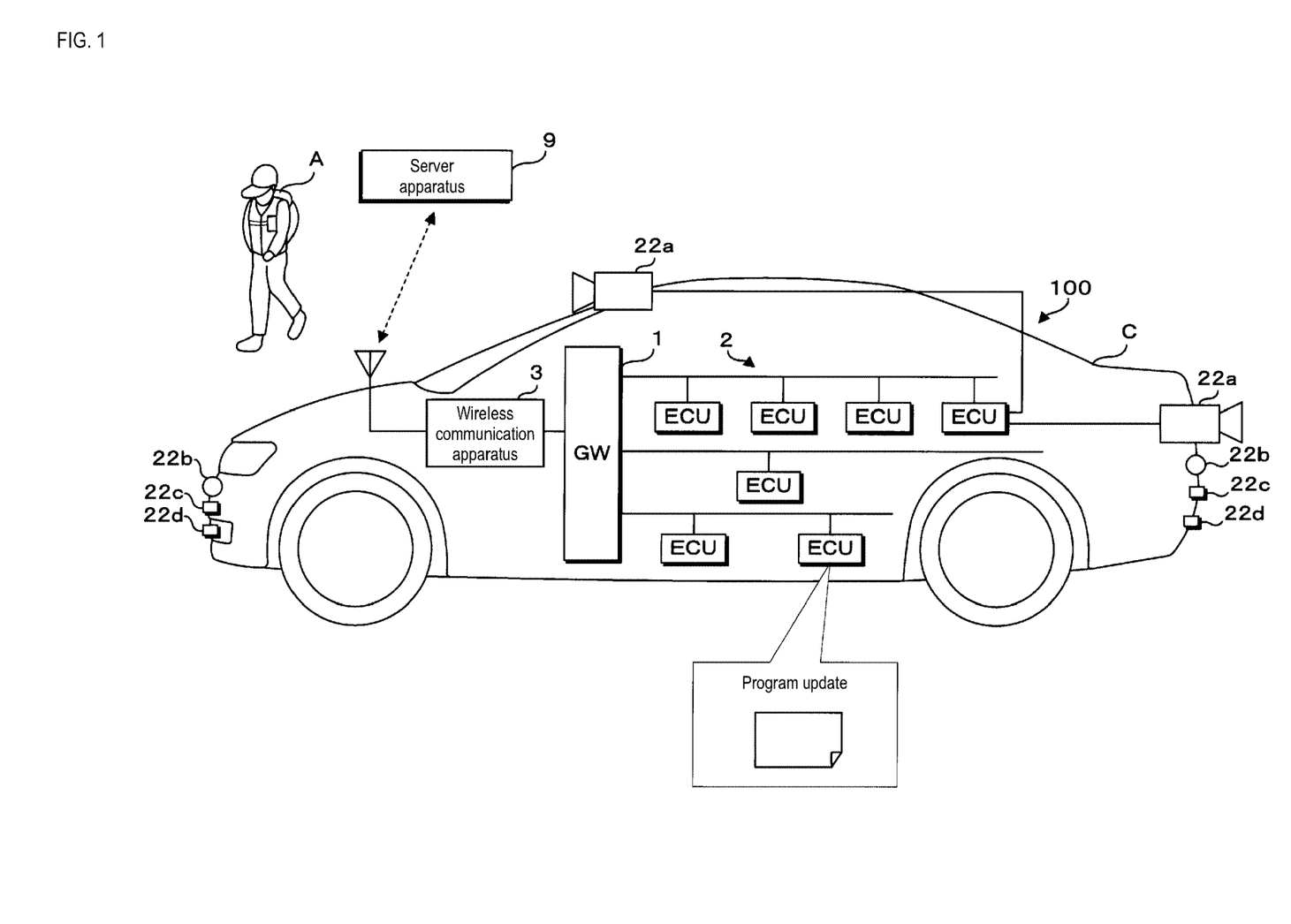
FIG. 1 is a schematic diagram illustrating a configuration of an update processing system according to the present embodiment.
Figure 2:
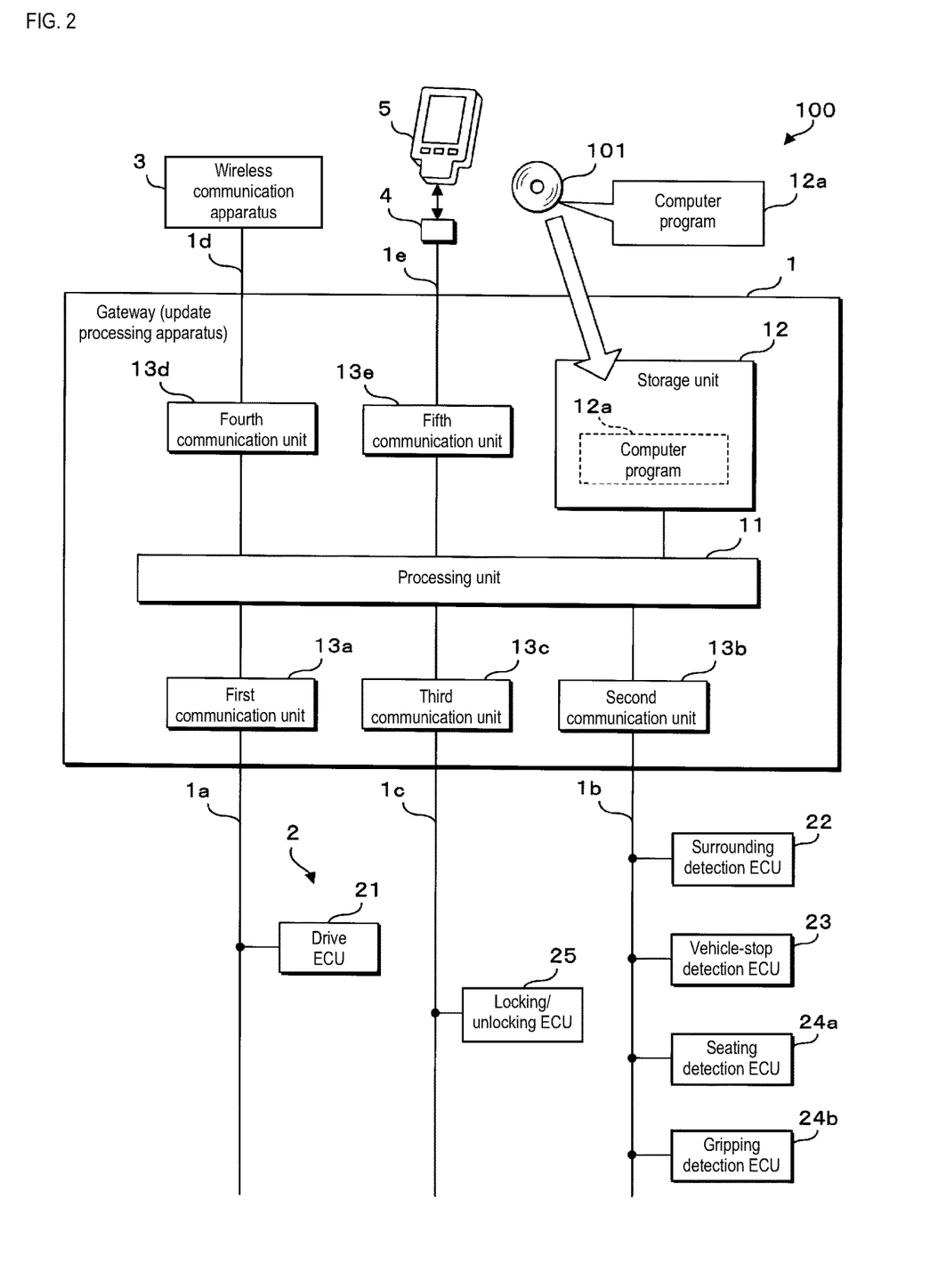
FIG. 2 is a schematic diagram illustrating a configuration of the update processing system and a gateway according to the present embodiment.

FIG. 1 is a schematic diagram illustrating a configuration of an update processing system 100 according to the present embodiment, and FIG. 2 is a schematic diagram illustrating configurations of the update processing system 100 and a gateway (on-board update apparatus) 1 according to the present embodiment. The update processing system 100 according to the present embodiment includes a plurality of ECUs 2 installed in a vehicle C, one wireless communication apparatus 3, and one gateway 1.

Each ECU 2 is connected to any one of communication lines 1a, 1b, and 1c, and can perform communication via the communication line 1a, 1b, or 1c to which the ECU 2 is connected. In the example shown in FIG. 2, a drive ECU (a first on-board apparatus) 21 is connected to the communication line 1a, a surroundings detection ECU (a second on-board apparatus) 22, a vehicle-stop detection ECU 23, a seating detection ECU (a third on-board apparatus) 24a, and a gripping detection ECU (the third on-board apparatus) 24b are connected to the communication line 1b, and a locking/unlocking ECU 25 is connected to the communication line 1c. In the present embodiment, these ECUs are correctively referred to as ECUs 2 as appropriate. The gateway 1 relays communication between the communication lines 1a, 1b, and 1c, so that the plurality of ECUs 2 can communicate via the communication lines 1a, 1b, 1c, and the gateway 1.

The drive ECU 21 is, for example, an ECU 2 that controls the operation of the engine of the vehicle C. The configuration of the drive ECU 21 will be described later.

The surroundings detection ECU 22 is connected to an on-board camera 22a that captures an image of the vehicle surroundings, an ultrasonic sensor 22b that performs detection of an object present around the vehicle, a millimeter-wave radar 22c, and a laser radar (LIDAR: light detection and ranging) 22d. Either a monocular camera or a stereo camera can be used as the on-board camera 22a. The on-board camera 22a may also capture an image of a person A with visible light or may also capture an image of a person A with infrared light. The surroundings detection ECU 22 according to the present embodiment performs detection of a person A present around the vehicle based on an image captured by the on-board camera 22a and the detection data of the ultrasonic sensor 22b, the millimeter-wave radar 22c, the laser radar 22d (LIDAR), and the like. A person A includes not only a pedestrian, but also a person A riding on a two wheeled vehicle. A person A may be identified using a trained model trained through deep learning, for example. Deep learning is a type of machine learning, and classifies images and detection results of sensors and radars into predetermined classes. The surroundings detection ECU 22 learns a large amount of object images of stationary obstacles other than a person A present around the vehicle, object images of the person A, object images of objects such as buildings present around the vehicle, and the vehicle C, and the like, and stores weight coefficients for associating features of the person A and the like with classes corresponding to the features as learning results. The surroundings detection ECU 22 specifies the class to which the detection target belongs, by inputting the obtained image data and the detection result of each sensor to the learned model. Whether or not the detection target is a person A is specified by specifying the class. The surroundings detection ECU 22 transmits, to the gateway 1, an outside-of-vehicle detection result indicating whether or not a person A is present around the vehicle. The gateway 1 receives the outside-of-vehicle detection result transmitted from the surroundings detection ECU 22, and can determine whether or not a person A is present around the vehicle based on the received outside-of-vehicle detection result.

The vehicle-stop detection ECU 23 is connected to, for example, a vehicle speed sensor, a position switch that outputs a signal corresponding to a position of a shift lever of the vehicle C, an ignition switch, or the like. The vehicle speed sensor is, for example, a wheel speed sensor, and outputs a pulse signal corresponding to the rotational speed of the wheel. The vehicle-stop detection ECU 23 determines whether or not the vehicle C is stopped based on a signal that is output from the vehicle speed sensor, the position switch, the ignition switch, or the like, and outputs, to the gateway 1, a vehicle-stop detection result indicating whether or not the vehicle C is stopped. The gateway 1 receives the vehicle-stop detection result transmitted from the vehicle-stop detection ECU 23, and can determine whether or not the vehicle C is stopped based on the received vehicle-stop detection result.

The seating detection ECU 24a includes a pressure-sensitive sensor, a weight sensor, and the like embedded in the seat of the vehicle C, detects whether or not an occupant is seated in the seat, and transmits an inside-of-vehicle detection result to the gateway 1. The gateway 1 receives the inside-of-vehicle detection result transmitted from the seating detection ECU 24a, and can determine whether or not a person A is present in the vehicle, based on the received inside-of-vehicle detection result.

The gripping detection ECU 24b includes a touch sensor provided on the steering wheel. The touch sensor is, for example, a capacitive sensor, and the gripping detection ECU 24b determines whether or not the driver is gripping the steering wheel based on a signal of the touch sensor. The gripping detection ECU 24b transmits, to the gateway 1, the inside-of-vehicle detection result indicating whether or not the steering wheel is being gripped. The gateway 1 receives the inside-of-vehicle detection result transmitted from the gripping detection ECU 24b, and can determine whether or not a person A is present in the vehicle, based on the received inside-of-vehicle detection result.

The locking/unlocking ECU 25 is connected to an actuator that drives a locking/unlocking apparatus (not shown) that locks and unlocks the doors of the vehicle. When request switches of the doors of the vehicle are operated and an authorized portable device is present near the doors, the locking/unlocking ECU 25 drives the locking/unlocking apparatus to lock or unlock the doors of the vehicle. Further, when a signal instructing locking/unlocking of the doors is transmitted from the authorized portable device and the locking/unlocking ECU 25 receives the signal, the locking/unlocking ECU 25 drives the locking/unlocking apparatus to lock or unlock the doors of the vehicle. The detection of the operation state of the request switches, the wireless communication process with the portable device, the position detection of the portable device, the authentication process of the portable device, and the like may also be performed by another ECU 2. The locking/unlocking ECU 25 may receive, from the other ECU 2, an operation state of the request switches, a position detection result of the portable device, an authentication result, a signal for instructing locking/unlocking wirelessly transmitted from the portable device, and the like.

The locking/unlocking ECU 25 can transmit information indicating locked/unlocked state of the doors to the gateway 1 via the communication line 1c. The gateway 1 can recognize the locked/unlocked state of the doors by receiving the information transmitted from the locking/unlocking ECU 25.

In the update processing system 100 according to the present embodiment, a wireless communication apparatus 3 is connected to the gateway 1 via the communication line 1d. The gateway 1 can communicate with a server apparatus 9 installed outside the vehicle C via the wireless communication apparatus 3.

The wireless communication apparatus 3 can communicate with the server apparatus 9 installed outside the vehicle C by performing wireless communication using, for example, a mobile phone communication network or a wireless local area network (LAN). The wireless communication apparatus 3 can relay communication between the gateway 1 and the server apparatus 9, and transmits data provided from the gateway 1 to the server apparatus 9, and provides data received from the server apparatus 9 to the gateway 1.

The server apparatus 9 manages and stores programs to be executed by the ECUs 2 installed in the vehicle C. In response to an inquiry from the vehicle C, the server apparatus 9 notifies whether or not it is necessary to update a program or the like stored in each ECU 2, and when it is necessary to update a program, the server apparatus 9 distributes an update program to the vehicle 9. The gateway 1 can communicate with the server apparatus 9, obtain an update program for updating a program 21d (described later) stored in an ECU 2, and transmit the obtained update program to that ECU 2.

A connector 4 for connecting an external device by wire is provided at an appropriate position of the vehicle C. The gateway 1 is connected to the connector 4 via a communication line 1e. A diagnosis tool 5 is detachably connected to the connector 4 via, for example, a communication cable. With this configuration, the gateway 1 can communicate with the diagnosis tool 5 via the communication line 1e, the connector 4, and the communication cable.

The diagnosis tool 5 is an apparatus provided in, for example, a dealer or a maintenance factory of the vehicle C, and is an apparatus for an operator to perform an inspection of a defect, a setting change, or the like of the vehicle C. The diagnosis tool 5 is a portable apparatus having, for example, an operation unit and a display unit. After the operator connects the communication cable of the diagnosis tool 5 to the connector 4 of the vehicle C and performs an appropriate authentication process or the like, the diagnosis tool 5 and the gateway 1 of the vehicle C can communicate with each other.

In the update processing system 100 according to the present embodiment, the gateway 1 periodically communicates with the server apparatus 9 via the wireless communication apparatus 3 to check whether or not the programs stored in the ECUs 2 need to be updated. When it is necessary to update a program, the gateway 1 obtains an update program from the server apparatus 9 and stores the update program in a storage unit 12 of the gateway 1. After obtaining the update program, the gateway 1 transmits the update program to the ECU 2 to be updated via the communication line 1a, 1b, or 1c to update that ECU 2. The ECU 2 receives the update program transmitted from the gateway 1 and stores the received update program in the storage unit 21b of that ECU 2, and updates the program by changing the program to be executed to the stored update program after the update program has been received. Hereinafter, in the present embodiment, an example in which the program of the drive ECU 21 is updated will be mainly described.

As illustrated in FIG. 2, the gateway 1 according to the present embodiment includes a processing unit (processor) 11, a storage unit (storage) 12, first to fifth communication units (transceivers) 13a to 13e, and the like. The processing unit 11 is constituted using an arithmetic processing device such as a central processing unit (CPU) or a micro-processing unit (MPU), and performs various kinds of arithmetic processing by reading and executing a computer program 12a stored in the storage unit 12. In the present embodiment, the processing unit 11 performs processing for relaying data transmission and reception between the communication lines 1a to 1e of the in-vehicle network and arithmetic processing necessary for update processing of the ECUs 2 and the like.

The storage unit 12 is configured using a nonvolatile memory element such as a flash memory or an electrically erasable programmable read only memory (EEPROM). The storage unit 12 stores various programs executed by the processing unit 11 and various data necessary for processing executed by the processing unit 11. In the present embodiment, the storage unit 12 stores a computer program 12a executed by the processing unit 11. The computer program 12a may also be written to the storage unit 12, for example, in the manufacturing stage of the gateway 1, or may also be distributed by the remote server apparatus 9 or the like and obtained by the gateway 1 through communication, or may also be recorded on a recording medium 101 such as a memory card or an optical disk and then read by the gateway 1 and stored in the storage unit 12, or may also be recorded on the recording medium 101 and then read by the writing apparatus and written to the storage unit 12 of the gateway 1. The computer program 12a may also be provided in the form of being distributed via a network, or may also be provided in the form of being recorded in the recording medium 101.

The gateway 1 includes a first communication unit 13a, a second communication unit 13b, a third communication unit 13c, a fourth communication unit 13d, and a fifth communication unit 13e. The first communication unit 13a, the second communication unit 13b, the third communication unit 13c, the fourth communication unit 13d, and the fifth communication unit 13e are connected to the communication lines 1a to 1e constituting the in-vehicle network, respectively, and perform data transmission and reception with the ECUs 2, the server apparatus 9, and the diagnosis tool 5 according to a predetermined communication protocol. In the present embodiment, the first to fifth communication units 13a to 13e perform data transmission and reception, based on the CAN communication standard, but the communication standard may also be any standard other than CAN. The first to fifth communication units 13a to 13e transmit information by converting data supplied from the processing unit 11 into electric signals and outputting the electric signals to the communication lines 1a to 1e, receive data by sampling and obtaining the potentials of the communication lines 1a to 1e, and supply the received data to the processing unit 11. The five first to fifth communication units 13a to 13e included in the gateway 1 may also perform communication according to different communication protocols.

Figure 3:
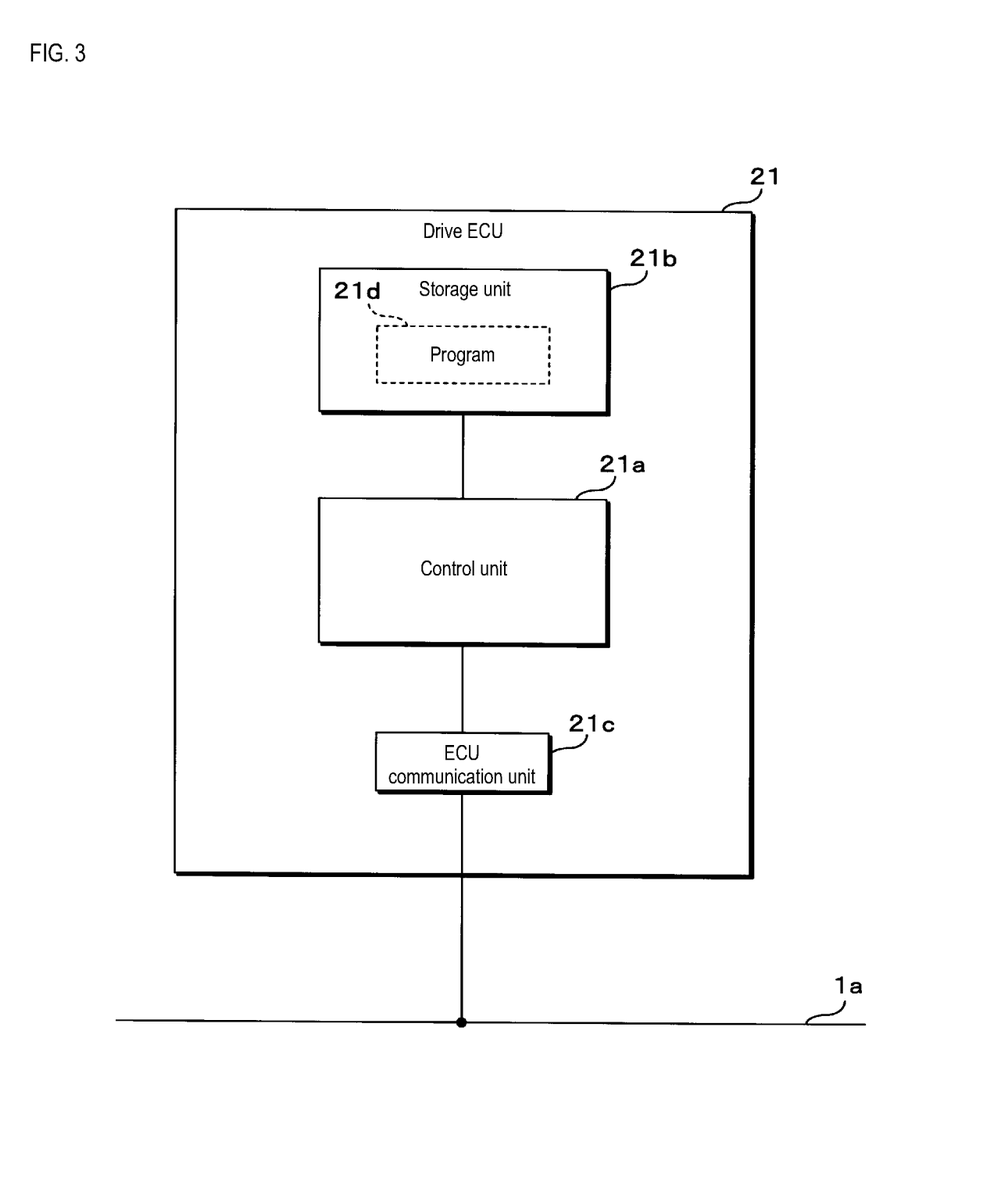
FIG. 3 is a schematic diagram illustrating a configuration of a drive ECU.

FIG. 3 is a schematic diagram illustrating a configuration of the drive ECU 21. Although the configuration of the drive ECU 21 among the plurality of ECUs 2 installed in the vehicle C is illustrated, the other ECUs 2 have the same configuration. The drive ECU 21 includes a control unit (processor) 21a, a storage unit (storage) 21b, an ECU communication unit (transceiver) 21c, and the like. Various sensors, actuators, and the like are connected to the control unit 21a according to the function of the ECU 2. The control unit 21a is configured using an arithmetic processing device such as a CPU or an MPU, for example, and performs various arithmetic processes by reading and executing a program 21d stored in the storage unit 21d. The program 21d stored in the storage unit 21b has different contents for each ECU 2.

The storage unit 21b is configured using a nonvolatile memory element such as a flash memory or an EEPROM. The storage unit 21b stores the program 21d executed by the control unit 21a and data required for executing the program 21d. The program 21d in the initial state may also be written in the storage unit 21b, for example, in the manufacturing stage of the drive ECU 21, or may also be recorded on a recording medium such as a memory card or an optical disk and then read by the drive ECU 21 and stored in the storage unit 21b, or may also be recorded on a recording medium and then read by the writing apparatus and written in the storage unit 21b of the drive ECU 21, for example. Note that, in the present embodiment, after the drive ECU 21 is installed in the vehicle C, the drive ECU 21 receives an update program transmitted from the gateway 1 via the communication line 1a, and the drive ECU 21 updates the program 21d stored in the storage unit 21b using the received update program.

In the present embodiment, two areas for storing the program 21d are provided in the storage unit 21b of the drive ECU 21. The two areas both have sufficient storage capacity for storing the program 21d. The control unit 21a reads the program 21d from one area of the storage unit 21b and performs processing, and the update program received from the gateway 1 is stored in the other area of the storage unit 21b. After having received the update program from the gateway 1, the drive ECU 21 updates the program 21d by switching the area from which the control unit 21a reads the program 21d.

The ECU communication unit 21c is connected to the communication line 1a constituting the in-vehicle network, and performs data transmission and reception in accordance with, for example, the CAN communication protocol. The ECU communication unit 21c converts the data supplied from the control unit 21a into an electric signal and outputs the electric signal to the communication line 1a to transmit the data, and samples and obtains the potential of the communication line 1a to receive data and supply the received data to the control unit 21a.

Figure 4:
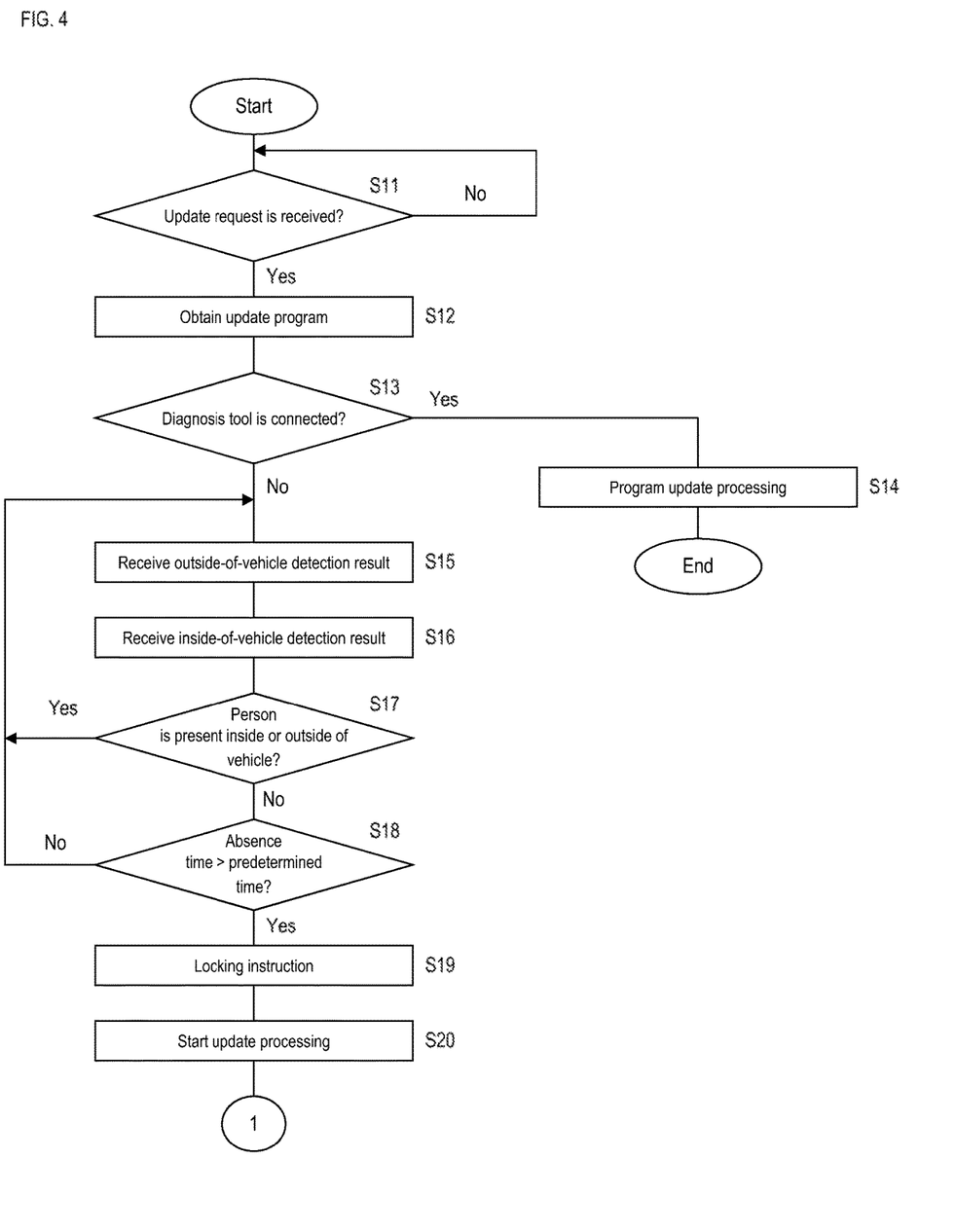
FIG. 4 is a flowchart illustrating a procedure of program update processing.
Figure 5:
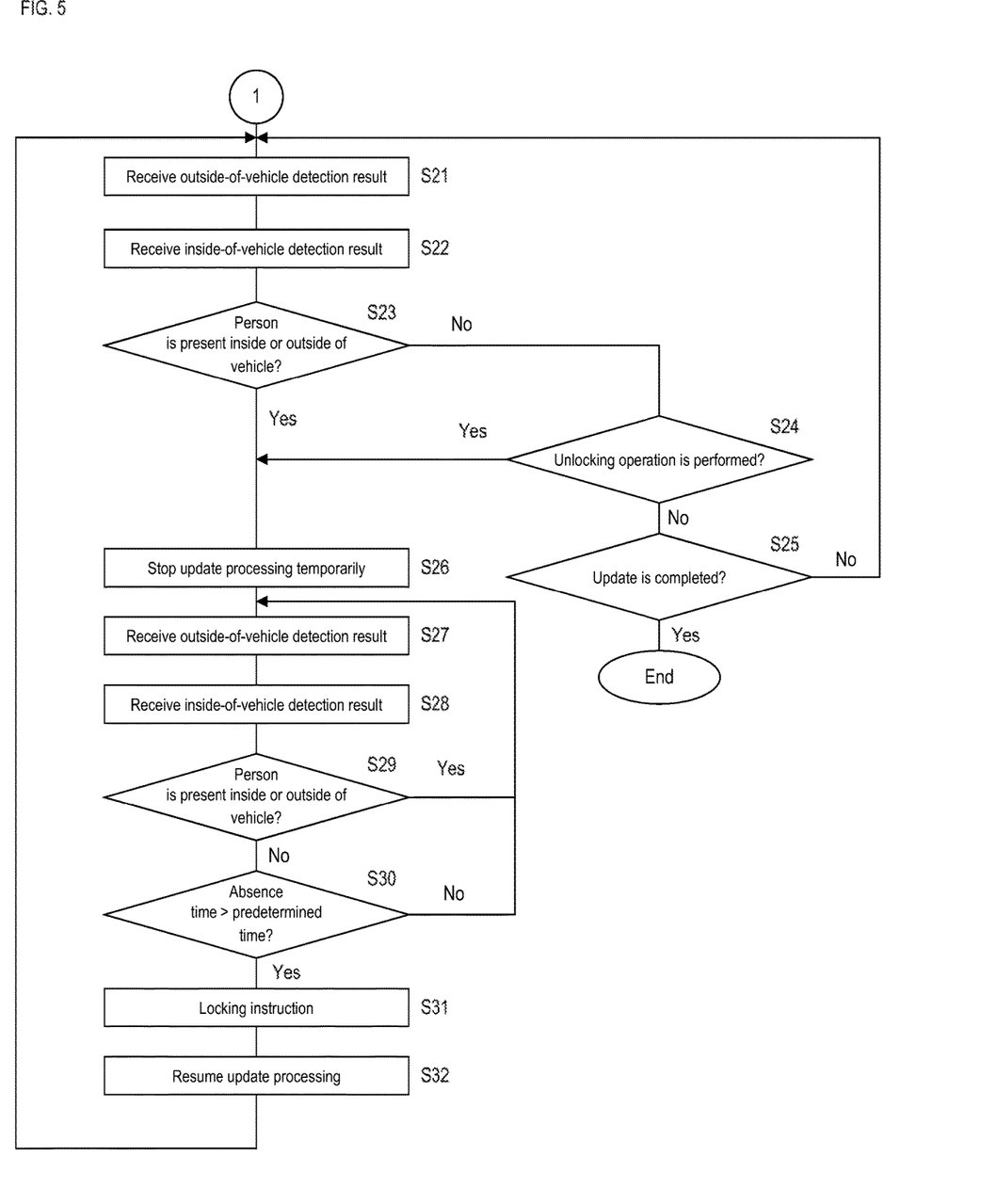
FIG. 5 is a flowchart illustrating a procedure of the program update processing.

FIG. 4 and FIG. 5 are flowcharts showing the procedure of the program update processing, and FIG. 6, FIG. 7A and FIG. 7B, and FIG. 8A, FIG. 8B and FIG. 8C are explanatory diagrams showing the program update method.

The processing unit 11 of the gateway 1 determines whether or not an update request has been received from the server apparatus 9 (step S11). When it is determined that the update request has not been received (NO in step S11), the processing unit 11 waits until the update request is received.

When it is determined that the update request has been received (YES in step S11), the processing unit 11 receives the update program transmitted from the server apparatus 9 that is the transmission source of the update request, thereby obtaining the update program to be used for update processing (step S12).

Figure 6:
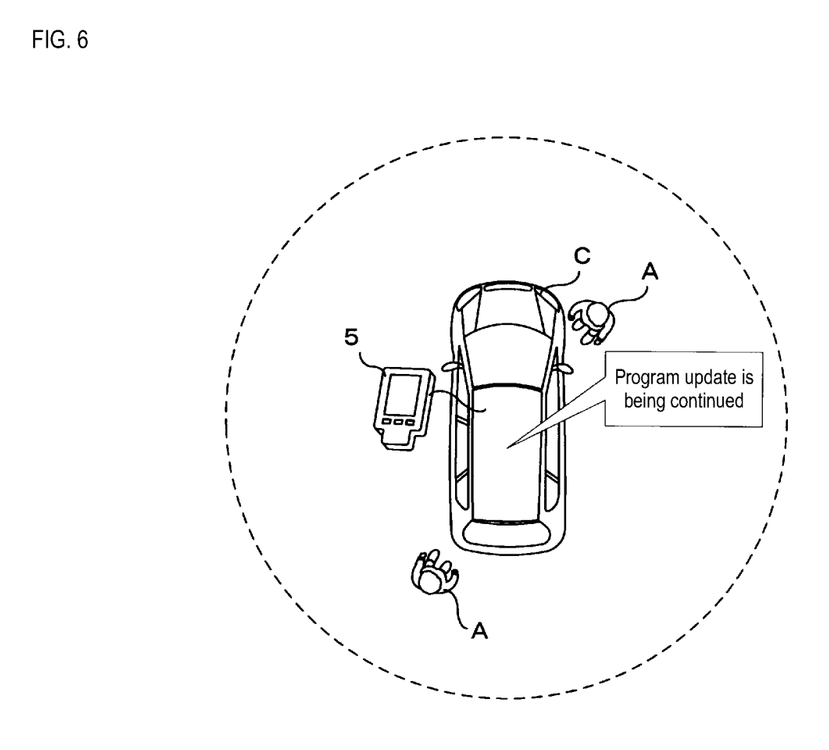
FIG. 6 is an explanatory diagram showing a program update method.

The processing unit 11 determines whether or not the diagnosis tool 5 is connected to the fifth communication unit 13e or the connector 4 of the gateway 1 (step S13). As shown in FIG. 6, when it is determined that the diagnosis tool 5 is connected (YES in step S13), the processing unit 11 executes update processing of the program 21d stored in the storage unit 21b of the ECU 2 using the update program obtained in step S12, without executing processing of detecting the presence or absence of a person A present inside or outside the vehicle (step S14). When having received, from the ECU 2, notification of the completion of the update processing of the program 21d, the processing unit 11 ends the program update processing.

Figure 7A:
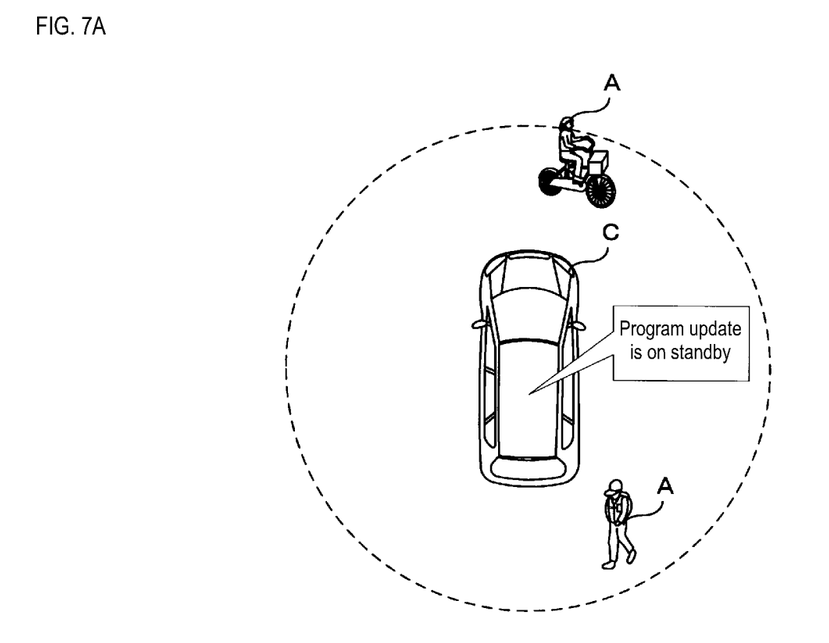
FIG. 7A is an explanatory diagram showing the program update method.

When it is determined that the diagnosis tool 5 is not connected (NO in step S13), the processing unit 11 receives an outside-of-vehicle detection result transmitted from the surroundings detection ECU 22 through the second communication unit 13b (step S15). The processing unit 11 receives an inside-of-vehicle detection result transmitted from the seating detection ECU 24a and the gripping detection ECU 24b through the second communication unit 13b (step S16). The processing unit 11 determines whether or not a person A is present around or in the vehicle, based on the inside-of-vehicle detection result and the outside-of-vehicle detection result received in step S15 and step S16 (step S17). As shown in FIG. 7A, when it is determined that a person A is present around or in the vehicle (YES in step S17), the processing unit 11 returns the processing to step S15, and continues monitoring the surroundings and the inside of the vehicle. That is to say, the processing unit 11 waits, without executing program update processing.

When it is determined that no person A is present around and in the vehicle (NO in step S17), the processing unit 11 determines the absence time of a person A around or in the vehicle, that is to say, whether or not a predetermined time has elapsed after it is determined that no person A is present around and in the vehicle (step S18). When it is determined that the absence time of a person A is within the predetermined time (NO in step S18), the processing unit 11 returns the processing to step S15 and continues monitoring the surroundings and the inside of the vehicle.

Figure 7B:
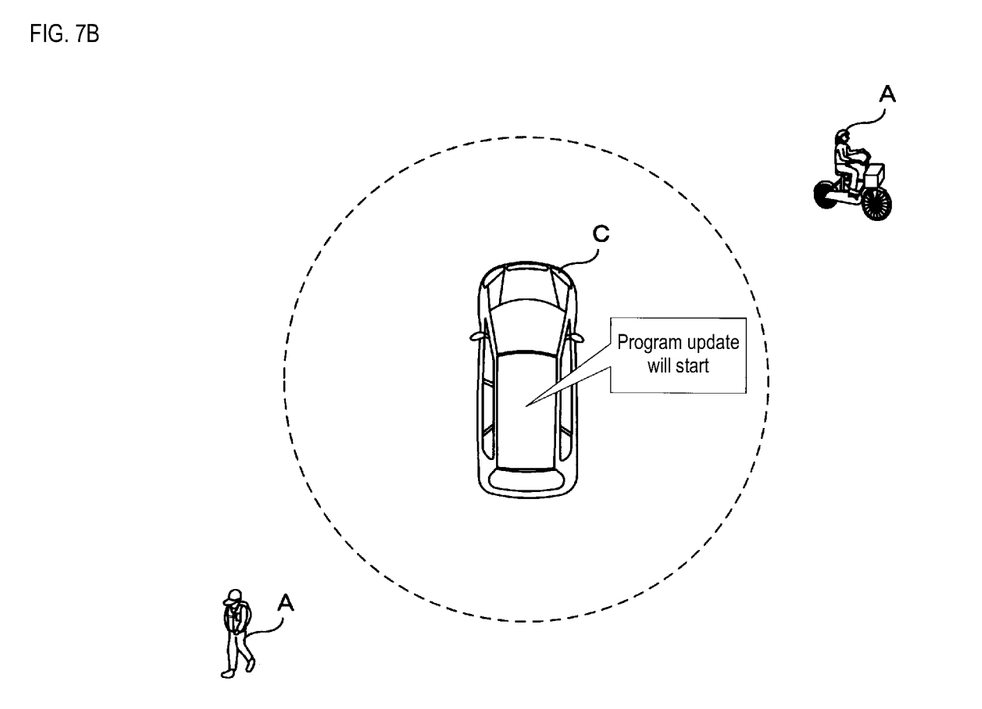
FIG. 7B is an explanatory diagram showing the program update method.

As shown in FIG. 7B, when it is determined that the predetermined time has elapsed since it is determined that no person A is present around and in the vehicle (YES in step S18), the processing unit 11 transmits a locking instruction signal for the doors of the vehicle C to the locking/unlocking ECU 25 through the third communication unit 13c (step S19). The doors of the vehicle C are locked due to the transmission of the locking instruction signal. Next, the processing unit 11 starts update processing of the program 21d stored in the storage unit 21b of the drive ECU 21 using the update program obtained in step S12 (step S20).

After starting the update processing, the processing unit 11 receives the outside-of-vehicle detection result transmitted from the surroundings detection ECU 22 through the second communication unit 13b (step S21), and receives the inside-of-vehicle detection result transmitted from the seating detection ECU 24a and the gripping detection ECU 24b through the second communication unit 13b (step S22). The processing unit 11 determines whether or not a person A is present around or in the vehicle, based on the inside-of-vehicle detection result and the outside-of-vehicle detection result received in the step 21 and step S22 (step S23).

Figure 8A:
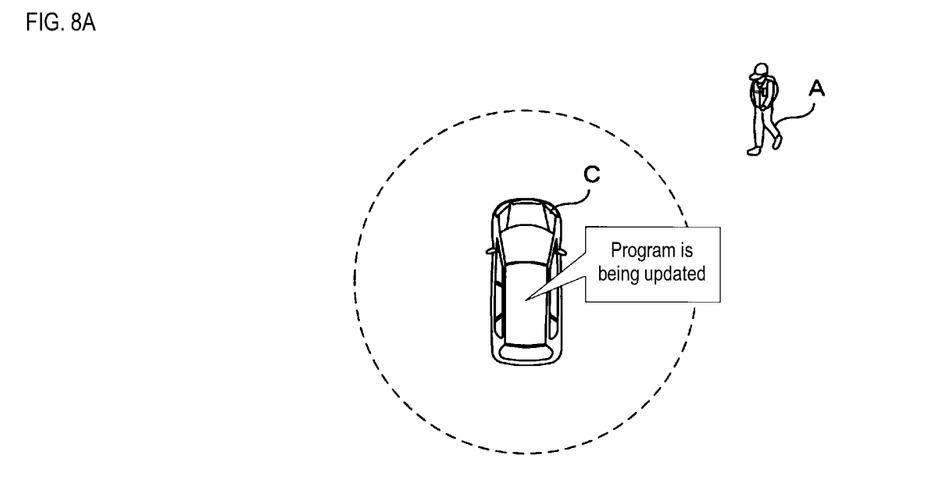
FIG. 8A is an explanatory diagram showing the program update method.

When it is determined that no person A is present around and in the vehicle (NO in step S23), the processing unit 11 communicates with the locking/unlocking ECU 25 and determines whether or not the unlocking operation has been performed (step S24). When it is determined that the unlocking operation has not been performed (NO in step S24), the processing unit 11 communicates with an ECU 2 and determines whether or not the update processing of the program 21d is completed (step S25). Each ECU 2 is configured, for example, to send a completion signal to the gateway 1 when the update of the program 21d is completed, and the processing unit 11 can determine whether or not the update is completed based on whether a completion signal sent from the ECU 2 has been received. As shown in FIG. 8A, when it is determined that no person A is present around and in the vehicle and the update of the program 21d is not completed (NO in step S25), the processing unit 11 returns the processing to step S21 and continues monitoring of a person A around and in the vehicle while continuing the program update processing. When it is determined that the update processing of the program 21d is completed (YES in step S25), the processing unit 11 ends the processing.

Figure 8B:
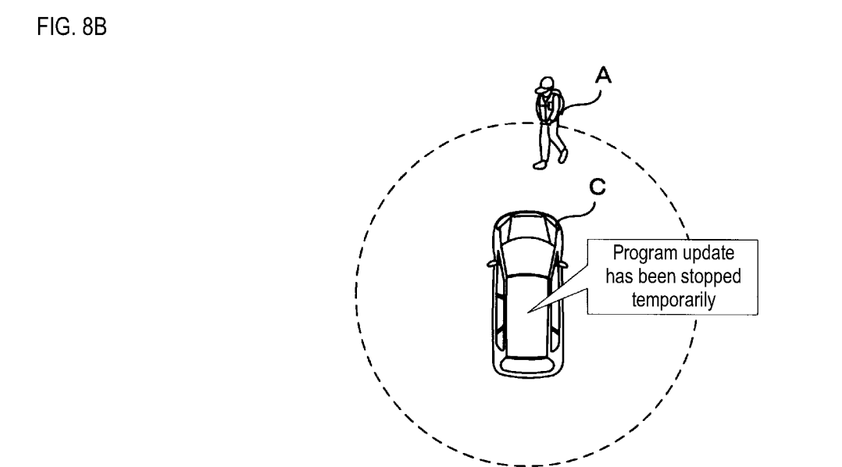
FIG. 8B is an explanatory diagram showing the program update method.

As shown in FIG. 8B, when it is determined that a person A is present around or in the vehicle during program update (YES in step S23), or when it is determined that the unlocking operation of the doors has been performed (YES in step S24), the processing unit 11 temporarily stops update processing of the program 21d (step S26). Specifically, the processing unit 11 transmits, to the drive ECU 21, a temporary stop instruction signal for instructing temporary stop of updating. The drive ECU 21 that has received the temporary stop instruction signal temporarily stops update processing of the program 21d.

Next, the processing unit 11 receives the outside-of-vehicle detection result transmitted from the surroundings detection ECU 22 through the second communication unit 13b (step S27), and receives the inside-of-vehicle detection result transmitted from the seating detection ECU 24a and the gripping detection ECU 24b through the second communication unit 13b (step S28). The processing unit 11 determines whether or not a person A is present around or in the vehicle, based on the inside-of-vehicle detection result and the outside-of-vehicle detection result received in step 27 and step S28 (step S29).

When it is determined that a person A is present around or in the vehicle (YES in step S29), the processing unit 11 returns the processing to step S27 and continues monitoring the surroundings and the inside of the vehicle.

When it is determined that no person A is present around and in the vehicle (NO in step S29), the processing unit 11 determines the absence time of a person A present around or in the vehicle, that is to say, whether or not a predetermined time has elapsed after it is determined that no person A is present around and in the vehicle (step S30). When it is determined that the absence time of a person A is within the predetermined time (NO in step S30), the processing unit 11 returns the processing to step S27 and continues monitoring the surroundings and the inside of the vehicle.

Figure 8C:
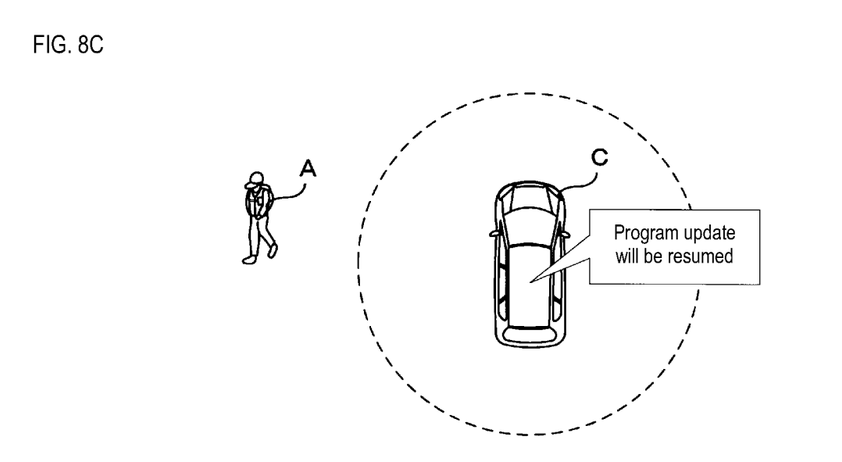
FIG. 8C is an explanatory diagram showing the program update method.

When it is determined that the predetermined time has elapsed since it is determined that no person A is present around and in the vehicle (YES in step S30), the processing unit 11 transmits a locking instruction signal of the doors of the vehicle C to the locking/unlocking ECU 25 through the third communication unit 13c (step S31), resumes the update processing of the program 21d (step S32) as shown in FIG. 8C, and returns the processing to step S21. Specifically, the processing unit 11 transmits, to the drive ECU 21, a resuming instruction signal for instructing resuming of the update processing. The drive ECU 21 that has received the resuming instruction signal resumes the update processing of the program 21d.

According to the update processing system 100, the gateway 1, the update processing method, and the computer program 12a according to the embodiment configured as described above, it is possible to execute program update processing of the on-board apparatus after it is confirmed that no person A is present around and in the vehicle, and restrict program update processing when a person A is present around or in the vehicle.

According to the present embodiment, the processing unit 11 executes the update processing of the program 21d stored in the storage unit 21b after the predetermined time has elapsed after it is confirmed that no person A is present around the vehicle. Therefore, it is possible to more reliably detect that no person A is present around the vehicle, and to avoid harm to people due to unexpected situation related to the program update.

According to the present embodiment, when a person A present around the vehicle is detected during update processing of the program 21d, the processing unit 11 temporarily stops the update processing, and then resumes the update processing of the program 21d after it is again confirmed that no person A is present around the vehicle. Therefore, it is possible to advance the update processing in a state where no person A is present around the vehicle, and to avoid harm to people due to unexpected situation related to the program update.

According to the present embodiment, when an unlocking operation is performed during update processing of the program 21d, the processing unit 11 temporarily stops the update processing. When the door is unlocked by remote control, a person A may approach the vehicle. Therefore, it is also possible to stop the update processing when there is a possibility that a person A is present around the vehicle, and to avoid harm to people due to unexpected situation related to the program update.

According to the present embodiment, the processing unit 11 locks the doors of the vehicle after the predetermined time has elapsed since it is confirmed that no person A is present around the vehicle. Therefore, it is possible to prevent the person A from entering the vehicle during the program update and operating the vehicle, and to more reliably avoid harm to people due to an unexpected situation related to the program update.

According to the present embodiment, when the diagnosis tool 5 is connected to the in-vehicle network, update processing of the program 21d is managed by a maintenance worker who has specialized knowledge. Accordingly, the processing unit 11 can execute the update processing of the program 21d stored in the storage unit 21b regardless of presence or absence of a person A around the vehicle. As a result, unnecessary interruption of the program update processing can be prevented, and the maintenance worker can efficiently perform the maintenance work of the vehicle.

According to the present embodiment, the processing unit 11 can execute the update processing of the program 21d stored in the storage unit 21b after confirming that no person A is present around the vehicle using the on-board camera 22a. The system can be configured at low cost by utilizing the on-board camera 22a.

Further, the processing unit 11 confirms that no person A is present around the vehicle using the ultrasonic sensor 22b, the millimeter-wave radar 22c, and the laser radar 22d, in addition to the on-board camera 22a. Therefore, it is possible to more reliably detect whether or not a person A is present around the vehicle, and to more reliably avoid harm to people due to an unexpected situation related to the program update. In particular, by using the millimeter-wave radar 22c, a person A can be detected, without being affected by weather. Also, the laser radar 22d can detect a person A more accurately than other radars.

In the present embodiment, an example, in which a reprogramming master (the update processing apparatus) that controls the program update processing of the ECUs 2 is configured as the gateway 1 has been described, but the reprogramming master may also be configured separately from the gateway 1. Further, in the present embodiment, an example in which programs of the ECUs 2 are configured has been described. However, a configuration may also be adopted in which a program of any reprogramming slave connected to an in-vehicle network in a wired or wireless manner is configured.

The invention claimed is:

1. An on-board update apparatus, comprising:
a communication unit configured to communicate with a first on-board apparatus including a storage unit that stores a program in a rewritable manner, a second on-board apparatus including a sensor that performs detection of a person present around a vehicle and configured to transmit a detection result indicating presence or absence of a person around the vehicle, and a third on-board apparatus including a sensor that performs detection of a person present in the vehicle and configured to transmit an inside-of-vehicle detection result indicating presence or absence of a person in the vehicle; and a processing unit configured to obtain an update program for updating the program stored in the storage unit from outside, and execute update processing of the program stored in the storage unit using the obtained update program, wherein the processing unit executes update processing of the program stored in the storage unit using the update program, when it is determined that no person is present around and in the vehicle based on the detection result and the inside-of-vehicle detection result received through the communication unit so as to prevent an update from occurring when a person is around or within the vehicle, and in a case where a predetermined time has elapsed without a person being detected around the vehicle, causes the communication unit to transmit a locking instruction signal for instructing locking of a door of the vehicle so as to prevent a person from entering the vehicle during the update.

2. The on-board update apparatus according to claim 1, wherein the processing unit executes update processing of the program stored in the storage unit using the update program when a predetermined time has elapsed after it is confirmed that no person is present.

3. The on-board update apparatus according to claim 1, wherein the processing unit stops update processing of the program executed by the first on-board apparatus when it is determined that a person is present around the vehicle during the update processing of the program, and resumes the update processing of the program when a predetermined time has elapsed after it is again determined that no person is present around the vehicle.

4. The on-board update apparatus according to claim 1, wherein the processing unit stops update processing of the program stored in the storage unit when an unlocking operation of a door of the vehicle is performed.

5. The on-board update apparatus according to claim 1, wherein when a communication apparatus related to maintenance of a vehicle is connected to an in-vehicle network to which the on-board update apparatus and the first on-board apparatus are connected, update processing of the program stored in the storage unit is executed using the update program regardless of presence or absence of a person around the vehicle.

6. The on-board update apparatus according to claim 1, wherein the detection result includes a result of performing detection of a person present around the vehicle using an on-board camera that captures an image around the vehicle, or a radar.

7. An update processing system, comprising:
the on-board update apparatus according claim 1;
a first on-board apparatus including the storage unit that stores the program in a rewritable manner;
a second on-board apparatus including a sensor that performs detection of a person present around the vehicle and configured to transmit the detection result indicating presence or absence of a person around the vehicle; and
a third on-board apparatus including a sensor that performs detection of a person present in the vehicle and configured to transmit an inside-of-vehicle detection result indicating presence or absence of a person in the vehicle.

8. An update processing method for executing update processing of a program stored in a storage unit included in a first on-board apparatus, comprising:
a step of obtaining an update program for updating the program stored in the storage unit from outside;
a step of performing communication with a second on-board apparatus including a sensor that performs detection of a person present around a vehicle and configured to transmit a detection result indicating presence or absence of a person around the vehicle;
a step of performing communication with a third on-board apparatus including a sensor that performs detection of a person present in the vehicle and configured to transmit an inside-of-vehicle detection result indicating presence or absence of a person in the vehicle;
a step of determining whether or not a person is present around or in the vehicle based on the detection result and the inside-of-vehicle detection result that are received;
a step of executing update processing of the program stored in the storage unit using the obtained update program when it is determined that no person is present around and in the vehicle so as to prevent an update from occurring when a person is around or within the vehicle; and
a step of transmitting, in a case where a predetermined time has elapsed without a person being detected around the vehicle, a locking instruction signal for instructing locking of a door of the vehicle so as to prevent a person from entering the vehicle during the update.

9. A computer program for causing a computer to execute update processing of a program stored in a storage unit included in a first on-board apparatus, causing the computer to execute:
a step of performing communication with a second on-board apparatus including a sensor that performs detection of a person present around a vehicle and configured to transmit a detection result indicating presence or absence of a person around the vehicle;
a step of performing communication with a third on-board apparatus including a sensor that performs detection of a person present in the vehicle and configured to transmit an inside-of-vehicle detection result indicating presence or absence of a person in the vehicle;
a step of determining whether or not a person is present around or in the vehicle based on the detection result and inside-of-vehicle detection result that are received;
a step of executing update processing of the program stored in the storage unit using an update program obtained from outside for updating the program when it is determined that no person is present around and in the vehicle so as to prevent an update from occurring when a person is around or within the vehicle; and
a step of transmitting, in a case where a predetermined time has elapsed without a person being detected around the vehicle, a locking instruction signal for instructing locking of a door of the vehicle so as to prevent a person from entering the vehicle during the update.

10. The on-board update apparatus according to claim 2, wherein the processing unit stops update processing of the program executed by the first on-board apparatus when it is determined that a person is present around the vehicle during the update processing of the program, and resumes the update processing of the program when a predetermined time has elapsed after it is again determined that no person is present around the vehicle.

11. The on-board update apparatus according to claim 2, wherein the processing unit stops update processing of the program stored in the storage unit when an unlocking operation of a door of the vehicle is performed.

12. The on-board update apparatus according to claim 3, wherein the processing unit stops update processing of the program stored in the storage unit when an unlocking operation of a door of the vehicle is performed.

13. The on-board update apparatus according to claim 2, wherein when a communication apparatus related to maintenance of a vehicle is connected to an in-vehicle network to which the on-board update apparatus and the first on-board apparatus are connected, update processing of the program stored in the storage unit is executed using the update program regardless of presence or absence of a person around the vehicle.

14. The on-board update apparatus according to claim 3, wherein when a communication apparatus related to maintenance of a vehicle is connected to an in-vehicle network to which the on-board update apparatus and the first on-board apparatus are connected, update processing of the program stored in the storage unit is executed using the update program regardless of presence or absence of a person around the vehicle.

15. The on-board update apparatus according to claim 4, wherein when a communication apparatus related to maintenance of a vehicle is connected to an in-vehicle network to which the on-board update apparatus and the first on-board apparatus are connected, update processing of the program stored in the storage unit is executed using the update program regardless of presence or absence of a person around the vehicle.

16. The on-board update apparatus according to claim 2, wherein the detection result includes a result of performing detection of a person present around the vehicle using an on-board camera that captures an image around the vehicle, or a radar.

17. The on-board update apparatus according to claim 3, wherein the detection result includes a result of performing detection of a person present around the vehicle using an on-board camera that captures an image around the vehicle, or a radar.

18. The on-board update apparatus according to claim 4, wherein the detection result includes a result of performing detection of a person present around the vehicle using an on-board camera that captures an image around the vehicle, or a radar.

19. The on-board update apparatus according to claim 5, wherein the detection result includes a result of performing detection of a person present around the vehicle using an on-board camera that captures an image around the vehicle, or a radar.

\* \* \* \* \*